United States Patent
Skinner

(10) Patent No.: US 9,581,489 B2
(45) Date of Patent: Feb. 28, 2017

(54) DISTRIBUTED ACOUSTIC SENSING WITH MULTIMODE FIBER

(71) Applicant: Halliburton Energy Services, Houston, TX (US)

(72) Inventor: Neal Gregory Skinner, Denton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 326 days.

(21) Appl. No.: 13/751,054

(22) Filed: Jan. 26, 2013

(65) Prior Publication Data

US 2014/0208855 A1     Jul. 31, 2014

(51) Int. Cl.
  *G01H 9/00*  (2006.01)
  *G01V 1/40*  (2006.01)
  *G01V 8/24*  (2006.01)

(52) U.S. Cl.
  CPC ............. *G01H 9/004* (2013.01); *G01V 1/40* (2013.01); *G01V 8/24* (2013.01)

(58) Field of Classification Search
  USPC .......................................... 73/643, 657, 665
  See application file for complete search history.

(56) References Cited

U.S. PATENT DOCUMENTS

| | | | | |
|---|---|---|---|---|
| 4,958,904 A | * | 9/1990 | Rawski | G02B 6/4295 250/227.11 |
| 5,812,251 A | * | 9/1998 | Manesh | 356/32 |
| 6,355,928 B1 | * | 3/2002 | Skinner | E21B 47/102 250/227.27 |
| 6,640,625 B1 | * | 11/2003 | Goodwin | G01N 9/24 73/152.05 |
| 8,408,064 B2 | | 4/2013 | Hartog | |
| 2005/0281530 A1 | * | 12/2005 | Rizoiu | A61B 18/20 385/146 |
| 2009/0097015 A1 | | 4/2009 | Davies et al. | |
| 2010/0107754 A1 | * | 5/2010 | Hartog et al. | 73/152.47 |
| 2010/0225916 A1 | * | 9/2010 | Nakahara | G01N 21/8507 356/436 |
| 2012/0111104 A1 | | 5/2012 | Taverner | |
| 2012/0210797 A1 | * | 8/2012 | Yu et al. | 73/705 |
| 2012/0277995 A1 | | 11/2012 | Hartog | |

FOREIGN PATENT DOCUMENTS

| | | | |
|---|---|---|---|
| WO | WO9427414 A1 | | 11/1994 |
| WO | WO9520144 | * | 1/1995 |
| WO | WO9520144 A1 | * | 1/1995 |
| WO | W2009056855 A1 | | 5/2009 |
| WO | WO2009148824 A1 | | 12/2009 |
| WO | WO2010053931 A1 | | 5/2010 |
| WO | WO2011149613 A2 | | 12/2011 |
| WO | WO2012028845 A1 | | 3/2012 |
| WO | WO2012054635 A2 | | 4/2012 |

* cited by examiner

*Primary Examiner* — Robert Huber
*Assistant Examiner* — Tarun Sinha
(74) *Attorney, Agent, or Firm* — Michael A. Ervin; Iselin Law, PLLC

(57) ABSTRACT

A method and system for distributed acoustic sensing using multimode optical fibers.

4 Claims, 1 Drawing Sheet

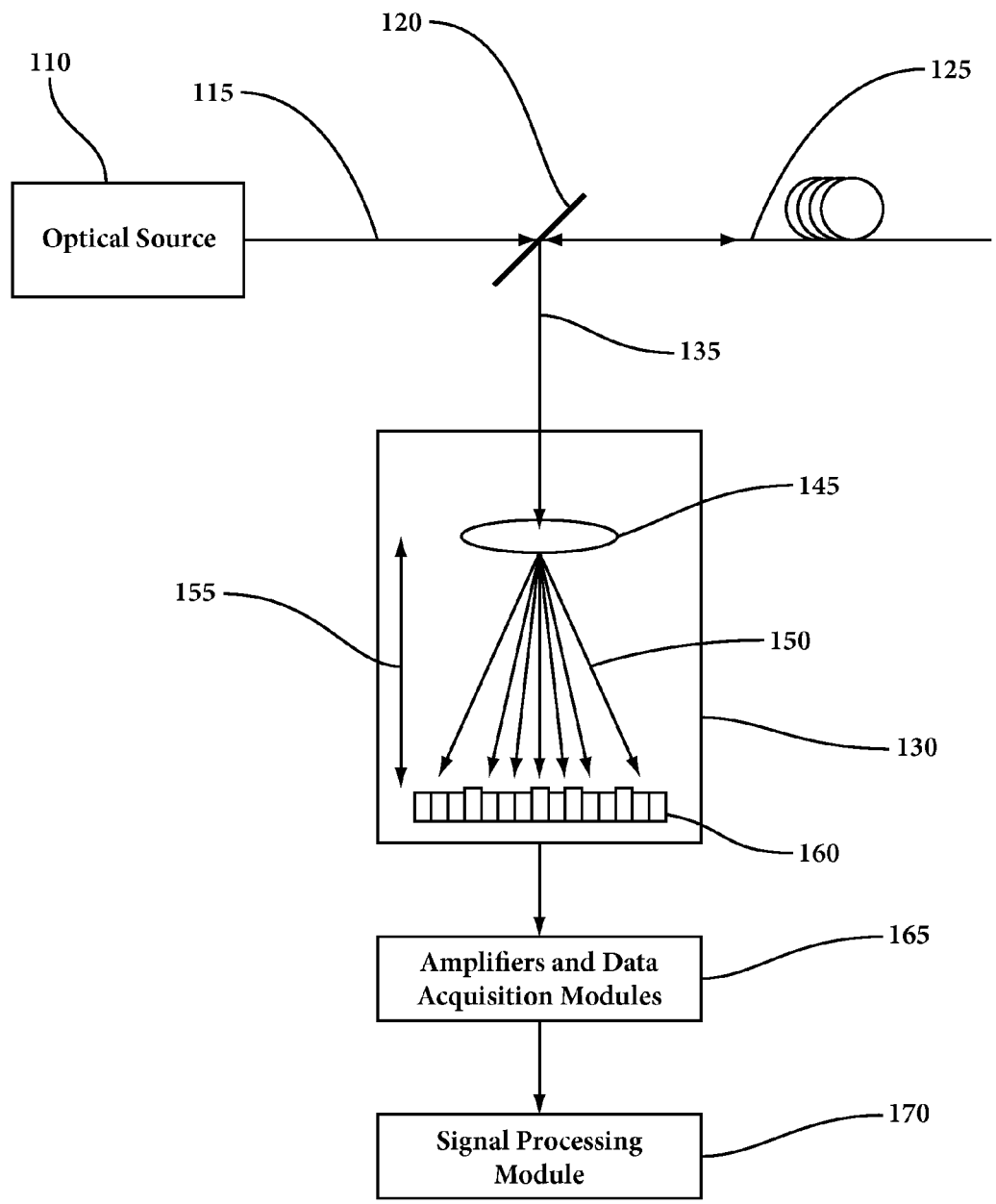

DISTRIBUTED ACOUSTIC SENSING WITH MULTIMODE FIBER

CROSS-REFERENCE TO RELATED APPLICATIONS

Not applicable.

BACKGROUND

Fiber-optic sensors are increasingly being used as devices for sensing some quantity, typically temperature or mechanical strain, but sometimes also displacements, vibrations, pressure, acceleration, rotations, or concentrations of chemical species. The general principle of such devices is that light from a laser is sent through an optical fiber and there the light experiences subtle changes and then reaches a detector arrangement which measures these changes.

In particular a growing application field is the use of fiber optic sensing system for acoustic sensing, especially Distributed Acoustic Sensing (DAS). DAS is quickly becoming recognized as a powerful tool for remote downhole sensing. The list of existing and potential applications for this new technology is long and continues to grow. Traditionally, DAS measurements are performed with single mode optical fiber (SMF), and not multimode optical fiber (MMF).

Distributed temperature sensing or DTS is a fairly mature and fairly widely deployed downhole oil and gas sensing technology that usually requires the use of MMF. For this reason, many hydrocarbon wells throughout the world already have MMF installed. The ability of using DAS with MMF can greatly expand the use of DAS in existing wells and will allow both types of measurements to be performed with one type of fiber.

BRIEF DESCRIPTION OF THE DRAWINGS

FIG. 1 illustrates an apparatus for achieving DAS sensing with multimode fibers.

DETAILED DESCRIPTION

In the following detailed description, reference is made that illustrate embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims.

FIG. 1 illustrates an approach to the ability to perform DAS using MMF fibers. Narrowband pulses of laser light are generated in optical source 110. The narrowband light is coupled into an input fiber 115. The input fiber is coupled to a beam splitter or multimode coupler 120 where the light pulses are launched into the multimode sensing fiber 125. In the multimode sensing fiber 125, the light pulses undergo coherent Rayleigh backscattering and are reflected back, toward the optical source. Rayleigh backscattering is a well-known optical phenomenon and is used as the basis of optical time domain reflectometry or OTDR. Rayleigh backscattering occurs when localized, microscopic changes in the optical fiber interact with a propagating pulse of light in a fiber. The incident pulse partially reflects upon the interaction, and a portion of the reflected light is recaptured by the fiber and returns toward the optical source.

Since the coherence length of the light pulses exceeds the physical length of the pulse in the MMF, coherent Rayleigh backscattering results when a light pulse scatters from two sites separated by a distance less than the coherence length of the pulse. When the coherent Rayleigh backscattered pulse is detected back at the surface, interferometric techniques can be used to determine very small changes in the length or temperature of the fiber along the entire length of the fiber. This decoding of the coherent Rayleigh backscattering into useful data is the basis of DAS.

When the backscattered pulses reach the beam splitter or coupler 120, they are directed towards a light tight detector enclosure 130 via a multimode return fiber 135 as shown rather than being allowed to return to the source 110. Multimode return fiber 135 from the beam splitter or coupler 120 then enters light tight detector enclosure 130 containing one detector, several discreet detectors or possibly a one or two-dimensional array of optical detectors 160. Multimode return fiber 135 is terminated in the light tight detector enclosure to allow the light to exit the terminal end of fiber 135. In an embodiment, the terminal end of multimode return fiber 135 is cleaved and polished normal to the axis of the fiber and separated from the at least one detector 160 by distance 155. Light leaving a fiber, either SMF or MMF, exits in a characteristic cone 150 related to the fiber's numerical aperture. An optional lens 145 may be positioned between the terminal end of multimode return fiber 135 and the at least one detector 160 in order to better control the spreading 150 of the beam as it exits fiber 135.

Data signals from the at least one detector 160 is fed via amplifiers and data acquisition modules 165 to a signal processing module 170 that performs DAS signal analysis using known techniques.

The distance 155, between the at least one detector 160 and the terminal end of fiber 135 or lens 145 is predetermined by testing such that only one or a few modes are detected. Limiting the number of modes received by a detector improves the contrast of the interference signals produced by coherent Rayleigh scattering and makes possible the use of MMF optical filers in DAS. In an alternate embodiment the distance 155 may be adjustable and be adjusted automatically or by the user to achieve optimum performance.

DAS signals are notorious for optical fading, where the signal strength is time dependent due to slowly varying changes in the fiber that result in changes in the optical path length between the interfering Rayleigh scatterers in the fiber. By using a tested and preselected distance 155 in conjunction with the at least one detector 160, and thereby detecting one or a small number of modes, the system can be optimized for the one detector or discreet group of detectors to generate the best signal for DAS analysis. Also, signal fading is depth dependent. In other words at any one time different signals from certain depths are strong while signals from other depths are weak. Multiple detectors could be used to insure that good signals are received along the entire fiber by using a combination of detectors that individually measure good signals only at limited locations along the sensing fiber.

The device and method exhibited in FIG. 1 allows DAS measurements to be made on multimode fiber. Multiple detectors, each responding to a single mode or a few modes, can eliminate signal fading.

This capability leads to the advantage that 1) DAS measurements are possible in any well with MMF previously installed for DTS measurements, and 2) that future installations may only require MMF.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method for downhole distributed acoustic sensing using multimode optical fibers comprising the steps of:
   a. injecting light energy into a multimode optical sensor fiber deployed downhole into a region of interest from a light source;
   b. collecting backscattered Rayleigh light from the multimode optical sensor fiber and directing it via a single return multimode optical fiber into a surface detector enclosure;
   c. terminating the single return multimode optical fiber inside the surface detector enclosure to allow the light leaving the terminal end of the single return multimode optical fiber to spread before it strikes two or more discreet detectors in the detector enclosure;
   d. adjusting the distance between the terminal end of the single return multimode fiber and the two or more discreet detectors to further spread the light leaving the single return multimode optical fiber before the light strikes any detectors in order to minimize the number of modes detected by the two or more discrete detectors;
   e. acquiring and amplifying the signals from the two or more discreet detectors; and
   f. performing distributed acoustic analysis on the acquired and amplified signals.

2. The method for downhole distributed acoustic sensing using multimode optical fibers of claim 1 further comprising inserting a lens between the terminal end of the single return multimode optical fiber and two or more discreet detectors.

3. The method for downhole distributed acoustic sensing using multimode optical fibers of claim 1 further comprising terminating the single return multimode optical fiber inside the surface detector enclosure by cleaving and polishing the terminal end of the single return multimode optical fiber normal to the axis of the fiber.

4. The method for downhole distributed acoustic sensing using multimode optical fibers of claim 1 wherein the two or more discreet detectors in the surface detector enclosure is a one or two-dimensional array of optical detectors.

* * * * *